No. 848,413. PATENTED MAR. 26, 1907.
J. S. TUTTLE.
SELF FEED MECHANISM FOR BALING PRESSES.
APPLICATION FILED MAY 8, 1906.

2 SHEETS—SHEET 1.

Witnesses
Frank R. Blow
H. C. Rodgers

Inventor
J. S. Tuttle
By George F. Thorpe Atty.

THE NORRIS PETERS CO., WASHINGTON, D. C.

No. 848,413. PATENTED MAR. 26, 1907.
J. S. TUTTLE.
SELF FEED MECHANISM FOR BALING PRESSES.
APPLICATION FILED MAY 8, 1906.

2 SHEETS—SHEET 2.

Witnesses
Frank R. Glow
H. C. Rodgers

Inventor
J. S. Tuttle.
By George W. Thorp
atty.

THE NORRIS PETERS CO., WASHINGTON, D. C.

UNITED STATES PATENT OFFICE.

JOSIAH S. TUTTLE, OF KANSAS CITY, MISSOURI, ASSIGNOR TO THE OHIO CULTIVATOR CO., OF BELLEVUE, OHIO, A CORPORATION OF OHIO.

SELF-FEED MECHANISM FOR BALING-PRESSES.

No. 848,413.      Specification of Letters Patent.      Patented March 26, 1907.

Application filed May 8, 1906. Serial No. 315,756.

*To all whom it may concern:*

Be it known that I, JOSIAH S. TUTTLE, a citizen of the United States, residing at Kansas City, in the county of Jackson and State of Missouri, have invented certain new and useful Improvements in Self-Feed Mechanism for Baling-Presses, of which the following is a specification.

This invention relates to self-feed mechanism for baling-presses; and my object is to produce mechanism of that class wherein the feeder is prematurely released in the event of meeting an obstruction which arrests its downward movement in the baling-case.

A further object is to produce means for automatically releasing the feeder when the latter has made its full normal stroke.

A still further object is to produce positive means for effecting the release of the feeder before the latter can come in contact with the bottom of the baling-chamber.

To these ends the invention consists in certain novel and peculiar features of construction and organization, as hereinafter described and claimed, and in order that it may be fully understood reference is to be had to the accompanying drawings, in which—

Figure 1:
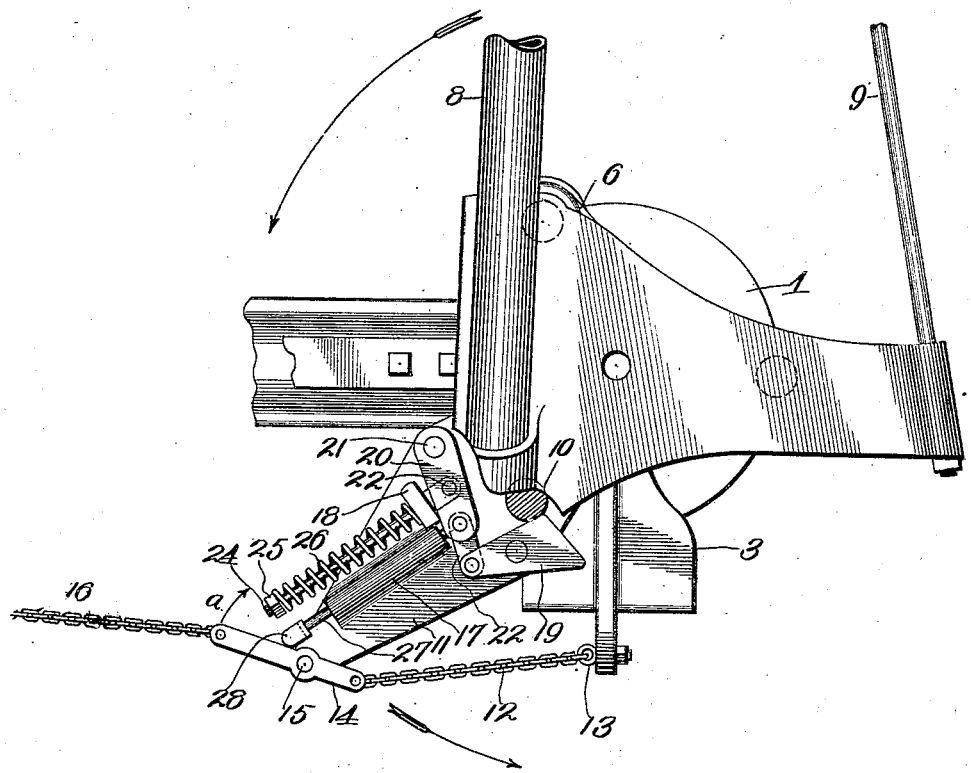
Figure 4:
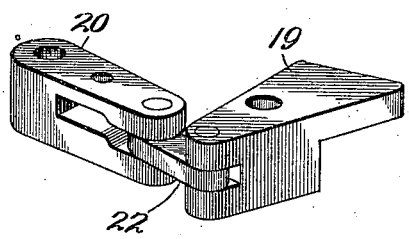
Figure 2:
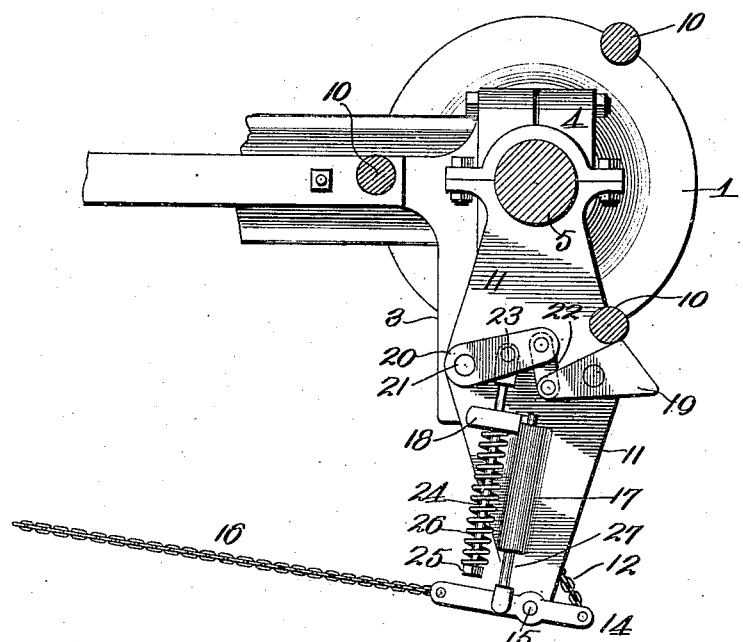
Figure 3:
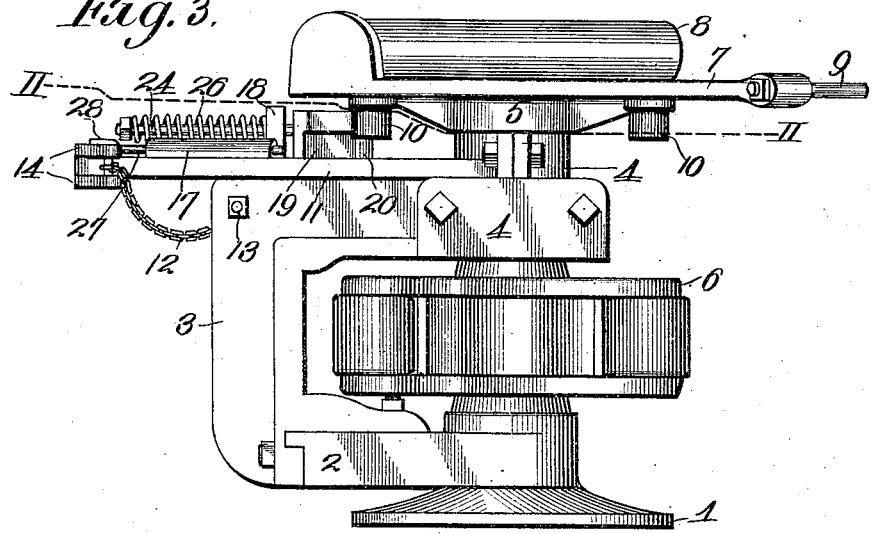

Figure 1 is a top plan view of a part of the power end of a baling-press equipped with self-feeder-release mechanism embodying my invention and occupying its initial position, the sweep-head being broken away and partly sectioned to disclose parts below it. Fig. 2 is a horizontal section taken on the line II II of Fig. 3 with the release mechanism tripped to permit the plunger to be reëlevated. Fig. 3 is a front view of the same. Fig. 4 is a detail perspective view of part of the releasing mechanism.

In the said drawings, 1 indicates the base-plate of the machine, adapted to be secured in any suitable or preferred manner to the front axle. (Not shown.)

2 indicates an arm projecting laterally from the base-plate, and 3 an angular casting secured to said arm and, in conjunction with cap 4 secured thereto, forming a bearing for the power-shaft 5, journaled at its lower end in the base-plate, said power-shaft being provided with a trip-lever 6 of the type shown or of any other suitable or preferred construction and with a sweep-head 7, provided with a sweep 8 and brace-rod 9 therefor. The sweep-head is provided with a plurality of depending bosses 10, adapted to successively travel over the horizontal swing-frame 11, resting upon casting 3 and journaled upon the power-shaft, as shown in Fig. 2, so as to be capable of swinging forward and backward thereon, the forward movement being positively limited, as hereinafter more particularly explained, by the chain 12, connected at one end, as at 13, to the casting and at its opposite end to a clevis 14, pivotally mounted at 15 on the outer end of the swing-frame, the opposite end of said clevis being pivotally connected to a chain or equivalent connection 16 to swing the feeder downward to force the baling material into the press when the swing-frame swings in the direction indicated by the arrow, Fig. 1, the automatic reëlevation of the feeder when the releasing mechanism, hereinafter described, is operated reversing such operation of the swing-frame. The baling-case, including the feeder, is omitted from the drawings, as they may be of any suitable or preferred type.

The swing-frame is provided at a suitable point with a tubular guide 17 and with an apertured stop-lug 18 and inward and forward of said guide and lug with a lever 19 in the horizontal plane of the bosses 10, and pivotally connecting the outer end of said lever to the forward end of a swing-arm 20, pivoted on the pin 21 of the swing-frame, is a link 22, said link and swing-arm constituting a break-joint brace between said lever and pin 21. Pivotally connected, as at 23, to the swing-arm and extending slidingly through the apertured lug 18 is a bolt 24, provided with a nut 25 at its outer end, equipped with a spiral expansion-spring 26, which bears at its opposite ends against lug 18 and said nut, so as to hold the break-joint brace with its elements in substantially the position shown in Fig. 1, and consequently with the lever in the path of the bosses 10.

27 indicates a slide-rod mounted in the guide 17, with its outer end or head 28 bifurcated, by preference, to receive the upper arm of the clevis 14 under certain conditions, as hereinafter explained, the inner end of said rod being adapted to engage the outer side of the break-joint brace at the junction of its elements.

When the feeder occupies its elevated or inoperative position, the swing-frame is in substantially the position shown in Fig. 1, and the spring 26 is expanded to hold the swing-arm against the stop-lug 18 and out of the path of the bosses 10 and the lever in the path of said bosses. As the sweep is turned by the team in the direction indicated by the contiguous arrow in the usual manner one of the bosses comes into engagement with the inner end of the lever, which, because of the fact that the break-joint brace is substantially straight and also because of the resistance of spring 26, offers resistance greater than the feeder. As a consequence the swing-frame is moved in the direction indicated by the contiguous arrow, Fig. 1, and through its connection with the feeder swings the latter downward to force a charge of baling material into the baling-chamber. If the charge is normal, the movement of the swing-frame continues to about the position shown in Fig. 2, at which time the clevis swinging in the direction indicated by the arrow $a$, Fig. 1, attains the position shown in Fig. 2 and has moved the slide-rod 27 inward and caused the same to impose inward pressure on and break the break-joint brace, so that the resistance of the feeder to further downward movement shall overcome the resistance of spring 26 and permit the boss engaging said lever to swing the latter and the parts connected thereto to about the position shown in Fig. 2. As the boss clears the lever the feeder is reëlevated and swings the swing-frame back to its original position, as shown in Fig. 1, and at the same time spring 26 reexpands and restores the lever and break-joint brace to its original position and again ready for operation by the following boss of the sweep-head.

In the event that an obstruction prevents the feeder making its full normal stroke the releasing mechanism is tripped before the swing-frame attains substantially the position shown in Fig. 2, said tripping action taking place without assistance on the part of the sliding rod 27, it being understood, of course, that the pivotal point between the elements of the break-joint brace should be slightly inward of the plane of the pin 21 and the pivotal point of connection of the brace with the lever.

Should the connection between the swing-frame and the feeder break, the frame, under the pressure of the engaging boss on the lever, will swing beyond the position shown in Fig. 2 until chain 12 is brought under tension and arrests such movement of the frame. In this event the releasing mechanism trips, the spring 26 yielding under the overpowering pressure exerted on the lever by said boss. The relation between the bosses and trip-lever arms will of course be such that the feeder will feed the charge of hay into the baling-case shortly after the recoil of the plunger-beam (not shown) occurs and will hold such charge until after the ensuing power-stroke of the plunger begins, as is customary in this type of machine, the feeder being released as explained, so as to be removed from the path of the advancing plunger.

From the above description it will be apparent that I have produced a self-feed mechanism for baling-presses embodying the features of advantage enumerated as desirable in the statement of the object of the invention, and I wish it to be understood that I do not desire to be restricted to the exact construction shown and described, as various changes in the form, proportion, detail construction, and arrangement of the parts may be made without departing from the principle of construction involved.

Having thus described the invention, what I claim as new, and desire to secure by Letters Patent, is—

1. A self-feed mechanism, comprising a swing-frame, a lever pivoted thereto, and a break-joint brace pivotally connecting said frame and lever.

2. A self-feed mechanism for baling-presses, comprising a swing-frame, a lever pivoted thereto, a break-joint brace pivotally connecting said frame and lever, and means for returning the break-joint brace to normal position after each breaking operation.

3. A self-feed mechanism, comprising a swing-frame, a lever pivoted thereto, a break-joint brace pivotally connecting said frame and lever, and a spring holding said break-joint brace in unbroken condition.

4. A self-feed mechanism for baling-presses, comprising a swing-frame, a lever pivoted thereto, a break-joint brace pivotally connecting said frame and lever, a rod suitably guided and pivoted to said break-joint brace, and a spring for exerting pressure on said rod to hold the break-joint brace unbroken.

5. A self-feed mechanism comprising a suitable framework, a swing-frame mounted thereon, a lever pivoted thereto, a break-jont brace pivotally connecting said frame and lever, an apertured lug on the spring-frame outward of said brace, a rod extending slidingly through said lug and pivoted at its inner end to said brace, a nut secured on the outer end of said rod, and a spiral spring encircling said rod and exerting pressure at its opposite ends against the outer side of said lug and the inner side of said nut.

6. A self-feed mechanism, comprising a suitable framework, a swing-frame mounted thereon, a lever pivoted to said frame, a break-joint brace pivotally connecting said frame with said lever and a flexible connection between the framework and said swing-frame to limit the forward movement of the latter.

7. A self-feed mechanism, comprising a suitable framework, a swing-frame mounted thereon, a lever pivoted thereto, a break-joint brace pivotally connecting said frame and lever, an apertured lug on the swing-frame outward of said brace, a rod extending slidingly through said lug and pivoted at its inner end to said brace, a nut secured on the outer end of said rod, a spiral spring encircling said rod and exerting pressure at its opposite ends against the outer side of said lug and the inner side of said nut, and a flexible connection between the swing-frame and said framework.

8. A self-feed mechanism, comprising a suitable framework, a swing-frame mounted thereon, a lever pivoted on said frame, a break-joint brace pivotally connecting said frame and said lever, a clevis pivoted on the outer end of said frame, and a slide-rod suitably guided and adapted to be caused by said clevis to break said brace.

9. A self-feed mechanism, comprising a suitable framework, a swing-frame mounted thereon, a lever pivoted on said frame, a break-joint brace pivotally connecting the frame and lever, means for holding the break-joint brace yieldingly unbroken, and means as said frame swings forwardly, to break said break-joint brace inwardly.

10. A self-feed mechanism, comprising a suitable framework, a swing-frame mounted thereon, a lever pivoted on said frame, a break-joint brace pivotally connecting the frame and lever, means for holding the break-joint brace yieldingly unbroken, a clevis pivoted to the outer end of said frame, and a slide-rod adapted as the swing-frame swings forwardly, to be moved inward by said clevis and break said break-joint brace inwardly.

11. A self-feed mechanism, comprising a suitable framework, a swing-frame mounted thereon, a lever pivoted on said frame, a break-joint brace pivotally connecting the frame and lever, means for holding the break-joint brace yieldingly unbroken, a clevis pivoted to the outer end of said frame, a slide-rod adapted as the swing-frame swings forward, to be moved inward by said clevis and break said break-joint brace inwardly, and a flexible connection between said clevis and said framework.

12. A self-feed mechanism comprising a rotating power-shaft provided with a boss, a swing-frame mounted on the power-shaft, a lever pivoted on the swing-frame, a break-joint brace pivotally connecting said frame and said lever, and means holding said brace yieldingly unbroken with the inner end of said lever in the path of said boss.

13. A self-feed mechanism, comprising a suitable framework, a power-shaft journaled thereon and provided with a sweep-head having bosses, a swing-frame mounted on the shaft, a lever pivoted on the swing-frame, a break-joint brace pivotally connecting said frame and lever, means for holding the break-joint brace unbroken and the inner end of the lever in the path of said bosses, and a flexible connection between the outer end of the lever and said framework.

14. A self-feed mechanism, comprising a suitable framework, a power-shaft journaled therein and provided with a sweep-head having depending bosses, a swing-frame mounted on the power-shaft below the sweep-head and resting on said frame, a lever pivoted on the swing-frame, a break-joint brace pivotally connecting said lever with the frame, means holding the break-joint brace yieldingly unbroken, a clevis pivoted on the outer end of said frame, and a slide-rod carried and guided by the swing-frame and adapted to be caused by said clevis to break said break-joint brace inwardly.

In testimony whereof I affix my signature in the presence of two witnesses.

JOSIAH S. TUTTLE.

Witnesses:
EVERT A. KEMP,
F. W. GÜNTHER.